United States Patent
von Niederhäusern

[11] Patent Number: 5,970,830
[45] Date of Patent: Oct. 26, 1999

[54] BAR FEEDER FOR FEEDING A MACHINE TOOL, IN PARTICULAR AN AUTOMATIC LATHE

[75] Inventor: Francis von Niederhäusern, Moutier, Switzerland

[73] Assignee: VN SA, Moutier, Switzerland

[21] Appl. No.: 09/095,610

[22] Filed: Jun. 11, 1998

[30] Foreign Application Priority Data

Jul. 18, 1997 [EP] European Pat. Off. .............. 97112336

[51] Int. Cl.⁶ ........................................ B23B 13/04
[52] U.S. Cl. ............................ 82/127; 82/126; 82/129; 414/14
[58] Field of Search ......................... 82/127, 126, 129, 82/1.11, 125; 414/14, 17, 18

[56] References Cited

U.S. PATENT DOCUMENTS

| | | | |
|---|---|---|---|
| 3,626,792 | 12/1971 | Eichenhofer | 82/34 A |
| 4,019,411 | 4/1977 | Bohn et al. | 82/2.7 |
| 4,914,993 | 4/1990 | Fabbri | 82/126 X |
| 4,958,543 | 9/1990 | Newton et al. | 82/126 X |
| 5,401,230 | 3/1995 | Momoi et al. | 82/127 X |
| 5,535,653 | 7/1996 | Berns et al. | 82/127 |

FOREIGN PATENT DOCUMENTS

| | | |
|---|---|---|
| 0 161 210 | 11/1985 | European Pat. Off. . |
| 0 311 953 | 4/1989 | European Pat. Off. . |
| 0 559 586 A1 | 9/1993 | European Pat. Off. . |
| 0 600 783 A1 | 6/1994 | European Pat. Off. . |
| 0 600 783 B1 | 6/1994 | European Pat. Off. . |
| 1 777 170 | 1/1970 | Germany . |
| 379 873 | 8/1964 | Switzerland . |
| 543 917 | 11/1973 | Switzerland . |

*Primary Examiner*—Andrea L. Pitts
*Assistant Examiner*—Henry W. H. Tsai
*Attorney, Agent, or Firm*—Griffin, Butler, Whisenhunt & Szipl, LLP

[57] ABSTRACT

The bar feeder provides bars (2') of material to a machine tool such as an automatic lathe. It includes a revolving barrel guide or an opening guide (4) in which the bar (2) to be machined is moved axially by a feed device including a pusher (20) driven by a chain (25). A first digital angular sensor (30) is associated with a pinion of this chain. A longitudinal camshaft (12) associated with a second digital angular sensor (35) actuates all the other operational mechanisms of the bar feeder. An automatic control electronic unit (31) can thus control in a reliable and precise manner all the bar feeder's operation, from signals originating from the machine tool and the two single sensors (30, 35) of the bar feeder.

15 Claims, 2 Drawing Sheets

BAR FEEDER FOR FEEDING A MACHINE TOOL, IN PARTICULAR AN AUTOMATIC LATHE

FIELD OF THE INVENTION

The present invention concerns a bar feeder for feeding a machine tool, in particular an automatic lathe, with bars of material to be machined by the machine tool, the bar feeder including:
- a guide forming at least one channel for accommodating and guiding a bar along an axis of rotation of the bar;
- one or more guide control mechanisms;
- a pusher arranged to move longitudinally in the channel and fitted with a rotating clamp for gripping a rear end of the bar;
- a motorized feed device, linked to the pusher to move it forwards and backwards;
- manipulation means arranged to hold the bar in at least one stop position, and
- automatic control means provided with sensors.

DESCRIPTION OF RELATED ART

A bar feeder, also called a bar loader is an apparatus intended to feed relatively long bar material to a machine tool such as an automatic lathe, which will machine a series of successive parts at the front end of said bar.

When a part is finished, the machine tool or bar feeder moves the bar forward in order for the following part to be machined. When the bar becomes too short to allow another part to be machined, the bar feeder has to withdraw the discard, pick up a new bar from a magazine and bring the latter to the machine to continue production.

Two main categories of bar feeders are known. The present invention can be applied to both of these categories.

The first category includes revolving magazine bar feeders. The magazine constitutes a multiple guide which contains a series of bars housed in as many tubes. The bar being machined is pushed from behind inside the tube by means of a pusher member called a pusher, having a rotating end portion fitted with a clamp which grips the back end of the bar. When a bar has been consumed, the pusher is withdrawn backwards and a control mechanism causes the magazine to rotate through one step to present a new bar between the pusher and the machine tool.

The second category includes bar feeders having a stationary guide provided with a guide channel which a control mechanism can open laterally, on the one hand for the bar to enter the channel, and on the other hand to allow the passage of the tag of a pusher which is fixed to the back of the bar and moves in the channel. The tag is a lateral plate connecting the pusher to a linear driving element such as a chain or a cable. Bar feeders of this kind form the subject in particular of EP Patent Application Nos. 0 161 210, 0 311 953, 0 559 586 and 0 600 783.

Current bar feeders of this type usually include an automatic control device which is coupled to the machine tool control and which receives data as to the operating state of the bar feeder from a group of sensors or detectors including different switches and relays. The control is sequential, different sequences being triggered by switches actuated by the movements of various elements of the bar feeder. The position of the pusher along the guide channel can be measured from the position of the chain or the cable which drives it. For example, in the device disclosed in EP Patent Application No 0 600 783, the motor driving the chain is fitted with an angular position sensor for measuring the rotation of this motor and deducing therefrom the position of the chain, the pusher and the bar.

However, the operation of these known control devices is often unsatisfactory, because the switches or relays, which operate in a harsh environment, sometimes have intermittent malfunctions which block the operation of the bar feeder. If this malfunction no longer exists when the bar feeder is restarted, one does not know where it originated from and it could be repeated at any time. Moreover, fine operating adjustment is difficult with such control means.

BRIEF SUMMARY OF THE INVENTION

The present invention concerns a bar feeder allowing the aforecited drawbacks to be substantially avoided. According to a particular aspect of the invention, the bar feeder is designed so as to include sensors or detectors in as small a number as possible having a high level of reliability.

The invention therefore concerns a bar feeder of the type indicated in the preamble, characterized in that it includes a motorized camshaft, whose cams actuate at least the guide control mechanisms and the manipulation means, and in that the sensors include a first position sensor, associated with the feed device for indicating the axial position of the pusher, and a second position sensor, associated with the camshaft for indicating the state of the functions controlled by said shaft. The camshaft can be rotating or sliding.

As a result of these arrangements, the automatic control of the bar feeder can operate, in conjunction with that of the machine tool, simply on the basis of two parameters measured by two respective sensors, which may be of a very reliable type, in particular digital angular encoders. The first sensor, associated with the feed device, allows not only the axial position of the pusher and the bar to be detected, but also the presence or absence of a bar and it proper attachment to the pusher, in cooperation with means for blocking the bar. On the other hand, since each function controlled by the camshaft can correspond to a particular angular sector of the rotation of said shaft (or its linear movement if it is a sliding shaft), the second sensor associated with said shaft is capable of indicating at each moment the position of the shaft, thus representing the state of these functions.

BRIEF DESCRIPTION OF THE DRAWINGS

Other features and advantages of the present invention will appear in the following description of a preferred embodiment, given by way of non-limiting example with reference to the annexed drawings, in which.

DETAILED DESCRIPTION OF THE INVENTION

Figure 1:
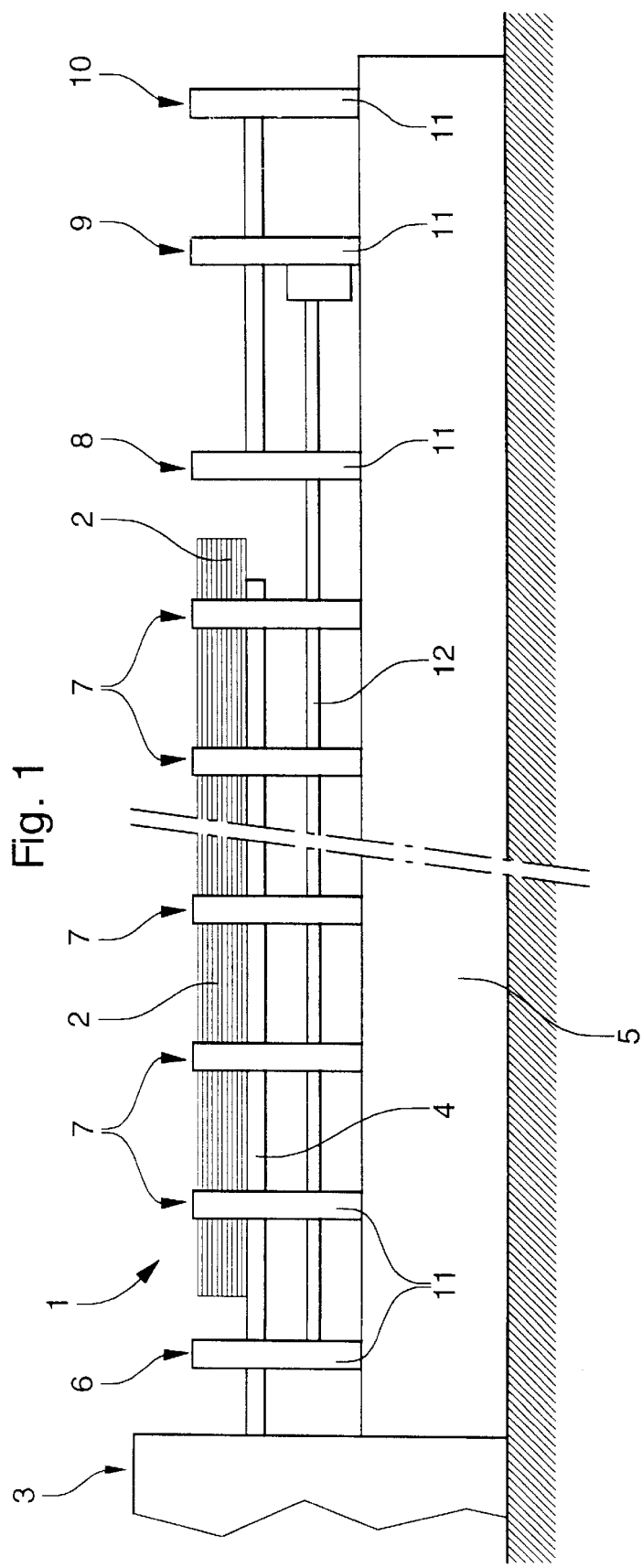
FIG. 1 is a general schematic lateral elevation view of a bar feeder having an opening guide according to the invention.

With reference to FIG. 1, bar feeder 1 is intended to introduce longitudinally bar material 2 into the headstock unit of an automatic lathe. Bar 2 which is being machined is housed in an opening guide 4 forming a channel into which it can rotate at high speed. Guide 4 can be of a known type and will not be described in detail here. It is subdivided into several sections, four in the present case, which can be opened separately as a function of the forward movement of the bar, and all together to accommodate a new bar.

The bar feeder includes a general frame 5 carrying a front station 6, a series of intermediate stations 7 and three rear stations 8, 9 and 10, each of stations 6 to 10 having a transverse support 11 mounted on frame 5. Intermediate stations 7 carry guide 4, as well as a lateral magazine containing a reserve of bars 2. A longitudinal camshaft 12 is mounted parallel to guide 4 on the supports of stations 6 to 8. As will be seen hereinafter, it controls all the mechanisms of the bar feeder, with the exception of the bar feed device, which has been omitted from FIG. 1 in order to clarify the drawing.

Figure 2:
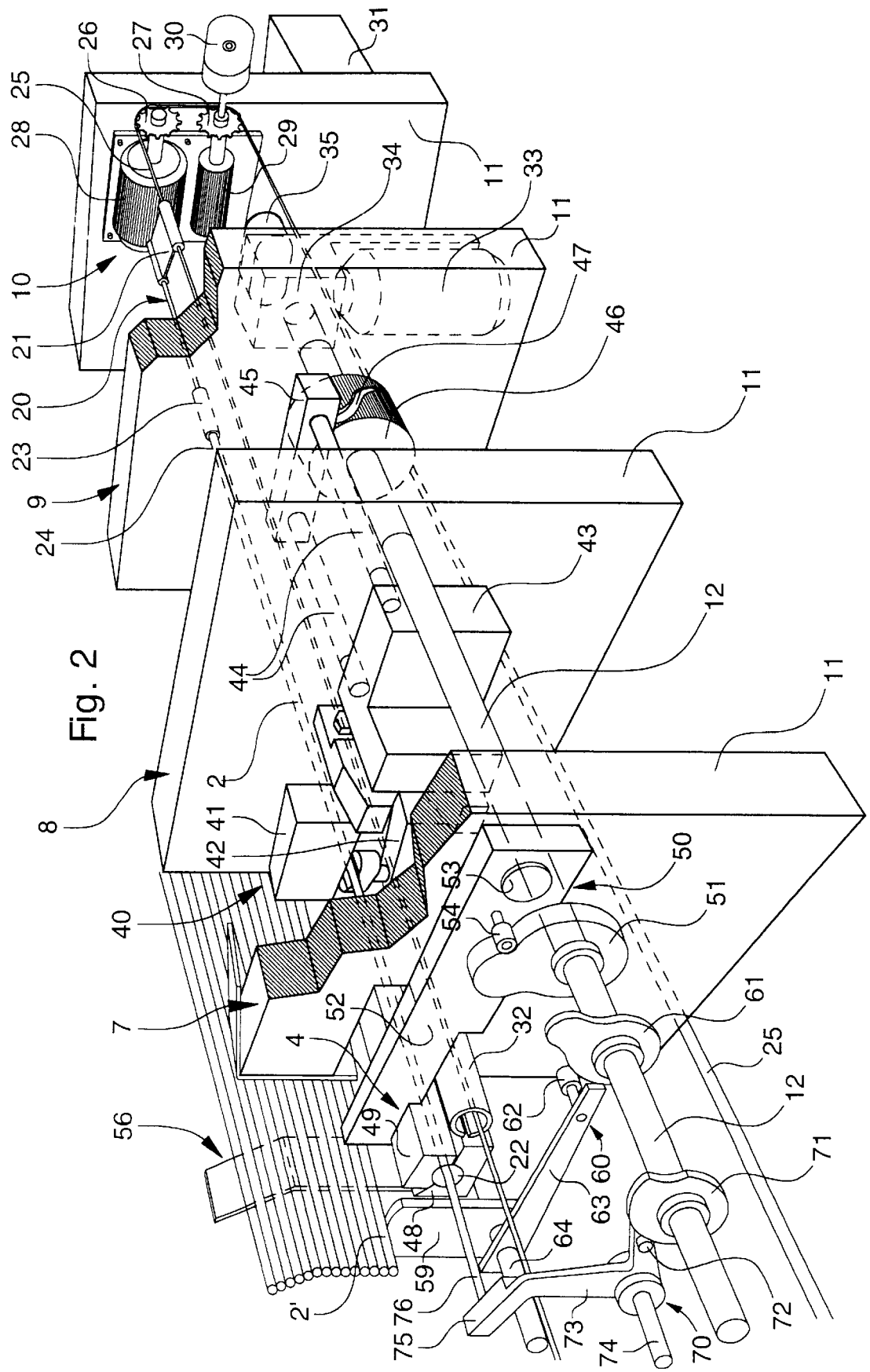
FIG. 2 is a partial schematic perspective view showing the main components of the bar feeder which feature in the present invention.

In FIG. 2, one can see the essential components of the feed device, including a pusher 20 with a tag 21 which slides into longitudinal channel 22 of guide 4. In a known manner, the front end of pusher 20 is formed by an end portion with a rotating clamp 23 capable of gripping the rear end 24 of bar 2 and allowing said bar to rotate whereas the rest of pusher 20 does not rotate. Clamp 23 closes by itself and thus does not need to be controlled. Outside guide 4, tag 21 is fixed to a drive chain 25 which forms an endless loop passing over sprocket wheels, in particular two wheels 26 and 27 situated in station 10 and two return wheels situated in the first of intermediate stations 7. The upper strand of chain 25 is guided by a tube 32 having a slot to allow tag 21 to pass. Station 10 includes a two-directional electric motor 28 driving chain via wheel 26, a bearing 29 carrying wheel 27, as well as a first angular sensor 30 formed by a multiturn absolute angle encoder which delivers its output signal to an electronic control unit 31 disposed in station 10 or in another station of the bar feeder. Encoder 30 may be for example of the type AG 665 P 31 manufactured in Germany by the company Max Stegmann GmbH, Donaueschingen. This encoder has a resolution of 1024 points per revolution over 64 revolutions, with a Gray code parallel output. Thus it is capable of accurately measuring the axial position of pusher 20 over the entire travel of the latter. The pusher could advance to a limit position at which the length of the rest of the bar which it holds is no longer sufficient to allow machining of an additional part and thus constitutes discard. This limit position is programmed by the operator in control unit 31. This unit is preferably an <<intelligent>> unit, programmed to <<learn>> which bar length is used up by machining each part, by calculating the average of the read advances effected for the first parts of a series.

Station 9 is the driving station for camshaft 12. It includes an electric motor 33 which may be one-directional, an endless screw reducing gear 34 connecting motor 33 to shaft 12, and a second angular sensor 35 coupled to shaft 12 and preferably formed by a mono-revolution absolute encoder. This encoder may be of the type AG 613 XKRP 1024 of the aforementioned Stegmann company, having a resolution of 1024 points per revolution and a Gray code parallel output. Of course, this output is connected to unit 31.

Station 8 is fitted with an extraction clamp 40 arranged for gripping bar 2 to block it or impose thereon movements of limited amplitude in order to engage it in rotating clamp 33 and to withdraw it therefrom. Clamp 40 comprises two jaws 41 and 42 mounted on a base 43 and actuated by fixed longitudinal cam surfaces (not shown) attached to support 11 of station 8, when clamp 40 is moved along bar 2. For this purpose, base 43 is carried by two guides 44 which slide in supports 11 of stations 8 and 9 and which are connected by a crosspiece 45 extending above a bell-shaped cam 46 of camshaft 12. This cam has a sinuous groove 47 on its periphery in which a follower (not shown) of crosspiece 45 engages. Thus, in certain sectors of the rotation of cam 46, clamp 40 moves axially with an amplitude imposed by groove 47, closing and opening on a predetermined portion of its travel. Since clamp 40 is driven positively in both directions by cam 46, the camshaft can apply thereto relatively large axial forces for extraction of the bar. In order to absorb these forces, station 8 includes a mechanism (not shown) for blocking the pusher by its tag 21. This mechanism is also actuated by a cam of shaft 12, placed behind cam 46.

Each section of guide 4 constitutes a guide bearing formed of a fixed lower element 48 and a moving cover 49. Each intermediate station 7 includes a bearing control mechanism 50, including a cam 51 fixed onto shaft 12, a lever 52 fixed to cover 49 and mounted on a horizontal pivot 53, and a following roller 54 co-operating with cam 51 to raise the lever and cover 49. Each cover 49 extends through two stations 7 and is actuated by their two bearing control mechanisms 50. The profile of each cam 51 allows channel 22 to be opened slightly, to allow tag 21 to pass, and to be opened further once per revolution of shaft 12 to admit a new bar 2' from magazine 56 into the channel.

At least two selectors 59 are disposed above bar magazine 56 and act as pushers to bring the new bar transversely into channel 22. They form part of a feed mechanism 60 including a cam 61 followed by a roller 62 mounted on a lever 63. The latter is fixed to a rotating selection shaft 64 which carries selectors 59.

Finally, front station 6 includes a bar stopping mechanism 70 actuated by a cam 71 of shaft 12. This cam is followed by a roller 72 of a stop lever 73 mounted on a horizontal pivot 74. It is thus possible to bring a stop 75 formed by the end of lever 73 in front of the outlet of channel 22, to stop the front end 76 of the bar to be machined 2 in order to define a precise initial position, from which the movements of the bar will be measured by means of sensor 30.

It is to be noted that channel 22 of guide 4 has a diameter large enough to accommodate bars 2 of different diameters. In order to properly maintain the bar behind the dividing apparatus of lathe 3, the bar feeder preferably includes an opening front guide (not shown), controlled by a specific cam of shaft 12 and provided with a removable plastic inner fitting which is adapted to the diameter of the bars to be machined. This front guide is situated between stop mechanism 70 and lathe 3.

The normal operating cycle of bar feeder 1 occurs over a complete revolution of camshaft 12 and includes successive steps each of which corresponds to a respective angular sector of the shaft rotation. In certain of these sectors, the shaft can take different positions to actuate in an appropriate manner the mechanisms that it controls, in combination with the movements of pusher 20. Thanks to angular sensor 35, control unit 31 knows at each moment the position of the camshaft, and thus also that of all the aforementioned mechanisms. The steps of the cycle are as follows, as soon as a new bar has been placed against stop 75.

1. Release of stop 75.

2. Stopping of camshaft 12. Beginning of slow advancement of pusher 20 to put bar 2 into lathe 3 at an initial programmed position to begin production. Gripping of the bar by a clamp of headstock unit of the lathe and machining of the successive parts in the lathe, with advancement of the bar by the pusher or the headstock unit, each time that a finished part has been detached from the bar, these operations being repeated until step 11.

3. Slight raising of fourth cover 49 for the passage of tag 21.

4. Stopping of the camshaft.

5. Slight raising of third cover 49.

6. Stopping of the camshaft.

7. Slight raising of second cover 49.

8. Stopping of the camshaft.

9. Slight raising of first cover 49.

10. Stopping of the camshaft.

11. Opening of the front guide to allow the pusher to pass. Machining of the last parts as far as the limit position of the pusher.

12. Stopping of the camshaft. Return of the pusher with the bar discard.

13. Gripping of extraction clamp 40 on the bar discard.

14. Stopping of the camshaft. Attempt to advance by the pusher to check that the discard is present and blocked by clamp 40.

15. Blocking of the pusher. Advance of clamp 40 gripped to pull the discard out from rotating clamp 23 of the pusher. Continuation of advance of clamp 40 to open it to drop the discard.

16. Second gripping of clamp 40.

17. Stopping of the camshaft. Attempt to advance by the pusher to check ejection of the discard.

18. Reopening of clamp 40. Wide raising of covers 49 to admit a new bar into guide 4. Feed of said bar by selectors 59.

19. Stopping of camshaft.

20. Closing of covers. Placing in position of stop 75. Blocking of the pusher. Withdrawal of clamp 40 to grip the bar and force it to enter rotating clamp 23. Unblocking of the pusher. Return of clamp 40 to reopen the pusher.

21. Stopping of the camshaft. Advance of the bar to press it against stop 75, thereby checking its presence and resetting to zero the counting of the bar advances. End of the cycle.

The preceding description shows that the entire operation of bar feeder 1 is controlled via only two sensors 30 and 35, which are of a particularly reliable and accurate type. Moreover, the use of these sensors allows the proper progression of several operations, which are capable of failing, to be checked, and thus to implement corrective procedures automatically, as well as alarms if necessary. The bar feeder does not use any switches actuated by movements, nor any presence sensors or force sensors. All tests causing force to intervene are transformed into pusher movement tests.

Moreover, it will be noted that <<intelligent>> control unit 31 can, according to the indications of first sensor 30, measure the total of the axial plays existing in the feed device, in particular in chain 25 and between the latter and rotating clamp 23, by effecting a back-and-forth movement while bar 2 is blocked. Then it takes account of this measurement to calculate accurately each axial position of the bar. When lathe 3 is of the type having a moving headstock unit, causing the bar to advance and move backwards during machining of the piece, a large axial play can thus be arranged, greater than the length of the part to be machined, between the pusher and the chain in order for this latter not to be driven by the movements of the headstock unit during machining.

The fact that first sensor 30 is an absolute encoder, i.e. always indicating an angle with respect to a zero position, has the advantage of letting control unit 31 know the position of pusher 20 at all times, independently of the length of bar 2. One could however replace this encoder by a non-absolute incremental encoder and program the bar feeder to effect an initialization maneuver by putting the pusher against a stop which defines its zero position. But, for reasons of reliability, this maneuver would have to be repeated periodically.

It should also be noted that rotating camshaft 12 described hereinbefore could be replaced by a sliding camshaft fulfilling the same functions and driven longitudinally by a pinion and rack mechanism or a similar mechanism. In this case, the second sensor would preferably be an absolute multiturn angle encoder, coupled to the pinion of the rack to be associated with the camshaft.

What is claimed is:

1. A bar feeder for feeding a machine tool with bars of material to be machined by said machine tool, said bar feeder including:

a guide forming at least one channel for accommodating and guiding a bar along an axis of rotation of said bar;

one or more guide control mechanisms;

a pusher arranged to move longitudinally in said channel and fitted with a rotating clamp for gripping a rear end of said bar;

a motorized feed device linked to said pusher to move it forwards and backwards;

manipulation means arranged to hold said bar in at least one stop position; and automatic control means provided with sensors, wherein said bar feeder further includes a motorized camshaft, whose cams actuate at least said guide control mechanisms and said manipulation means, and wherein said sensors include a first position sensor, associated with said feed device for indicating the axial position of said pusher, and a second position sensor, associated with said camshaft for indicating the state of the guide control mechanisms and manipulation means controlled by said camshaft.

2. A bar feeder according to claim 1, wherein said camshaft is rotating and said second sensor is an absolute digital angular encoder.

3. A bar feeder according to claim 1, wherein said camshaft is sliding and said second sensor is an absolute digital angular encoder associated with said shaft via a pinion and rack mechanism or a similar mechanism.

4. A bar feeder according to claim 1, wherein said feed device includes a flexible driving member which is connected to said pusher and associated with said first sensor, and wherein said first sensor is a digital angular encoder driven by a wheel over which said flexible driving member passes.

5. A bar feeder according to claim 4, wherein said first sensor is an absolute multiturn angle encoder.

6. A bar feeder according to claim 1, wherein said guide includes a revolving magazine including on its periphery a series of guide channels, its control mechanism being arranged to cause said magazine to rotate.

7. A bar feeder according to claim 1, wherein said guide is an opening guide, its control mechanism being arranged to open and close it.

8. A bar feeder according to claim 1, wherein said manipulation means actuated by said camshaft include a bar stop mechanism arranged to place a stop in front of a front end of said bar.

9. A bar feeder according to claim 8, wherein said guide further includes a front opening guide, placed between said stop and said machine tool and controlled by said camshaft.

10. A bar feeder according to claim 1, wherein said manipulation means actuated by said camshaft include an extraction clamp arranged to be gripped on said bar and moved axially.

11. A bar feeder according to claim 10, wherein said extraction clamp includes a sliding base driven parallel to said bar by a cam of said camshaft, and jaws mounted on said base and actuated by co-operation with a fixed cam by the effect of the movement of said base, to grip said bar.

12. A bar feeder according to claim 10, wherein said manipulation means actuated by said camshaft include a mechanism for blocking said pusher, capable of acting during movement of said extraction clamp.

13. A bar feeder according to claim 7, wherein said manipulation means actuated by said camshaft include a feed mechanism arranged to feed a bar from a magazine to said channel of said guide when the latter is open.

14. A bar feeder according to claim 1, wherein said machine tool is an automatic lathe.

15. A bar feeder according to claim 4, wherein said flexible driving member is a chain or a cable.

* * * * *